(12) United States Patent  (10) Patent No.: US 7,594,011 B2
Chandra  (45) Date of Patent: Sep. 22, 2009

(54) NETWORK TRAFFIC MONITORING FOR SEARCH POPULARITY ANALYSIS

(75) Inventor: Rohit Chandra, Los Altos, CA (US)

(73) Assignee: Narus, Inc., Sunnyvale, CA (US)

( * ) Notice: Subject to any disclaimer, the term of this patent is extended or adjusted under 35 U.S.C. 154(b) by 1091 days.

(21) Appl. No.: 10/776,100

(22) Filed: Feb. 10, 2004

(65) Prior Publication Data

US 2005/0198268 A1  Sep. 8, 2005

(51) Int. Cl.
*G06F 15/173* (2006.01)
*G06F 17/00* (2006.01)

(52) U.S. Cl. .................. 709/224; 709/223; 715/205

(58) Field of Classification Search .......... 709/224, 709/223; 715/205
See application file for complete search history.

(56) References Cited

U.S. PATENT DOCUMENTS

| | | | | |
|---|---|---|---|---|
| 6,012,053 | A * | 1/2000 | Pant et al. ................. | 707/3 |
| 6,125,361 | A * | 9/2000 | Chakrabarti et al. .......... | 707/3 |
| 6,279,037 | B1 * | 8/2001 | Tams et al. ................. | 709/224 |
| 6,279,140 | B1 * | 8/2001 | Slane ...................... | 714/807 |
| 6,526,440 | B1 * | 2/2003 | Bharat ..................... | 709/219 |
| 6,763,362 | B2 * | 7/2004 | McKeeth ................... | 707/104.1 |
| 6,879,994 | B1 * | 4/2005 | Matsliach et al. ............ | 709/204 |
| 2002/0087679 | A1 * | 7/2002 | Pulley et al. ............... | 709/224 |
| 2002/0145981 | A1 * | 10/2002 | Klinker et al. .............. | 370/244 |
| 2003/0105744 | A1 * | 6/2003 | McKeeth ................... | 707/3 |
| 2003/0229692 | A1 * | 12/2003 | Vo ........................ | 709/224 |
| 2005/0021731 | A1 * | 1/2005 | Sehm et al. ................ | 709/224 |

OTHER PUBLICATIONS

Arasu, Arvind, "Searching the Web," ACM Transactions on Internet Technology, Aug. 2001, vol. 1, Issue 1, pp. 2-43.
Brin, Sergey et al., "The Anatomy of a Large-Scale Hypertextual Web Search Engine" [online], Apr. 1998, Proceedings of the Seventh International World-Wide Web Conference [retrieved on Feb. 4, 2004]. Retrieved from the Internet: <URL: http://www-db.stanford.edu/~backrub/google.html>.
Brin, Sergey et al., "The PageRank Citation Ranking: Bringing Order to the Web" [online], Jan. 29, 1998, pp. 107-117 [retrieved on Feb. 4, 2004]. Retrieved from the Internet: <URL: http://citeseer.nj.nec.com/page98pagerank.html>.

(Continued)

*Primary Examiner*—William C Vaughn, Jr.
*Assistant Examiner*—Ranodhi N Serrao
(74) *Attorney, Agent, or Firm*—Fenwick & West LLP

(57) ABSTRACT

The popularity of web pages is monitored and used to rank the web pages retrieved in response to an Internet search. The popularity of a web page is proportionate to the number of visits to that web page. Web pages with greater popularity are ranked higher in priority. Furthermore, the score of a first web page is propagated to a plurality of second web pages to which the first web page is linked substantially in relative proportion to the popularity of the links from the first web page to each of the second web pages. Monitoring devices monitor TCP packets traversing the Internet and extract information from the TCP packets, such as the requested URI or URL, the client IP address, a server IP address and a server host name, and a referrer URI, if any. The extracted information is forwarded to a processing module that keeps track of the popularity of the web pages.

22 Claims, 10 Drawing Sheets

OTHER PUBLICATIONS

Clements, Mark et al., "Phonetic Searching of Digital Audio" [online], date unknown, [retrieved on May 6, 2003]. Retrieved from the Internet: <URL: http://www.broadcastpapers.com/asset/Fast-TalkPhoneticSearching-print...>.

Franklin, Curt, "How Internet Search Engines Work" [online], date unknown, [retrieved on May 6, 2003]. Retrieved from the Internet: <URL: http://computer.howstuffworks.com/search-engine.htm/printable>.

Gardarin, Georges et al., "An Introduction to the e-XMLMedia Component Suite," e-XMLMedia Manual, Nov. 5, 2001, 27 pages.

Heydon, Allan et al., "Mercator: a Scalable, Extensible Web Crawler," Journal of World Wide Web, 1999, vol. 2, No. 4, pp. 219-229.

Lawrence, Steve et al., "Searching the World Wide Web," Science, Apr. 3, 1998, vol. 280, pp. 98-100.

Sullivan, Danny, "Yahoo's Search Engine Continues Evolving" [online], May 6, 2003, [retrieved on May 8, 2003]. Retrieved from the Internet: <URL: http://searchenginewatch.com/sereport/print.php/34721_2201931>.

Whalen, Jill, "Ten Tips to the Top of Google" [online], Apr. 30, 2003 [retrieved on May 8, 2003]. Retrieved from the Internet: <URL: http://www.searchenginewatch.com/searchday/print.php/34711_2198931>.

International Preliminary Report on Patentability, PCT/US2005/003891, Aug. 24, 2006, 10 pages.

International Search Report and Written Opinion, PCT/US2005/003891, Mar. 21, 2006, 13 pages.

\* cited by examiner

NETWORK TRAFFIC MONITORING FOR SEARCH POPULARITY ANALYSIS

TECHNICAL FIELD

The present invention relates generally to search technology, and more specifically, to a method and system for monitoring and analyzing network traffic for use in ranking the search results returned by a search engine.

BACKGROUND OF THE INVENTION

The World Wide Web is a massive collection of heterogeneous documents and content, and thus finding documents or content that relate to a particular subject may be challenging. Conventional Internet search engines are capable of retrieving information from the World Wide Web based upon keyword searches. With a conventional search engine, a user enters search terms or keywords that relate to the particular subject, and the search engine returns the web pages or URLs (Uniform Resource Locators) most relevant to those search terms or keywords.

Conventional search engines typically operate in two stages, i.e., a preparation stage and a search stage. In the preparation stage, the search engines scan all the documents on the World Wide Web using a web crawler and download the documents/content. The downloaded documents and content are indexed by the keywords contained within them to build a keyword index. For each web page that is crawled, all the searchable keywords are extracted, along with additional indicators of the relevance of each keyword such as frequency of occurrence, relative font size, position within document, and the like. In addition, a graph illustrating the hyperlink structure of the documents are built, where the nodes of the graph are the URLs of the documents and the edges between the nodes are the hyperlinks between the URLs corresponding to the documents. The importance of each node (URL) is determined by conventional page-rank algorithms.

Second, in the search stage, given a search item such as a keyword or a set of keywords, the search engines find all the matching web pages that match one or more keywords, and then attempt to sort the matching results in order of relevance or importance to the user based upon the search terms. In this regard, the search engines locate web pages matching the keywords by looking up the keyword index with the given search terms. The ranking of the found documents is determined using heuristics based on the importance of the keyword in each document, the number of matching terms, and the like. All the matching web pages are sorted (or ranked) in order of estimated importance to the user. The matching URLs are returned to the user typically in order of decreasing importance. Since the number of matching URLs can often be in the thousands, it is very useful to have a good ranking algorithm that can identify the most relevant results quickly for the user.

Conventional search engines estimate the importance (or relevance) of a particular matching web page typically based on two broad aspects: the content of the web page, and the hypertext (or citation) structure of the surrounding web. First, a conventional search engine analyzes the contents of a particular web page and examines criteria such as the frequency of occurrence of the search terms, the location of the search terms (e.g., the title is more relevant than the appendix), the font size of the search terms relative to the font size of the surrounding text, the document format (e.g., certain file formats such as word processing files are usually more important than other file formats such as simple web pages), the web location of the document (e.g., documents on major web portals are more important than those on an individual's web page), and the like. Each of these factors plays a role in determining the importance of a web page.

Second, a conventional search engine exploits the hypertext link structure of the World Wide Web by viewing it as a citation index. Pages that are referred to (linked to) by more pages are likely to be more important than pages that are linked to by fewer pages. Furthermore, pages that are referred to by important pages are themselves probably more important as well. This approach is described in greater detail, for example, in U.S. Pat. No. 6,526,440 to Bharat and in Lawrence Page et al., "The PageRank Citation Ranking: Bringing Order to the Web," Technical Report, Stanford University, 1998.

FIG. 1 is a diagram illustrating the concept of using the hypertext link structure of the World Wide Web (WWW) to refine the score of a web page on the WWW. The term "score" of a web page is used herein to refer to the ranking score of the web page used for returning search results to a user in the order of descending ranking scores, and covers the concept of "page rank" in Internet searches or other similar concepts. The nodes 102, 104, 106, 108, 110 represent web pages or URLs, and the links 112, 114, 116, 118, 120 between these nodes 102, 104, 106, 108, 110 represent hyperlinks from one web page to another. A conventional way to compute the score of a web page is to divide the score of a page equally amongst its outgoing links and propagate the divided score proportionately to each destination document. For example, assume that URLs 102, 104 have scores of R=10 and R=9 initially. The score R=10 of URL 102 is equally divided along the links 112, 116 to nodes 106, 108 (each is given a score of 5). The score R=9 of URL 104 is equally divided along the links 114, 118, 120 to nodes 106, 108, 110 (each is given a score 3). The scores of the URLs 106, 108, 110 become R=8, R=8, R=3, respectively, which result from adding the scores divided to the nodes 106, 108, 110 along the links 112, 114, 116, 118, 120 incoming to the nodes 106, 108, 110. This process may be repeated for the next set of nodes whose score was modified as a result of this score propagation until a steady state solution is reached.

However, conventional search engines are not capable of monitoring how many times particular web pages or URLs were actually visited (i.e., the popularity of web pages) for use in determining the importance of those web pages, although the actual number of visits to a web page would strongly indicate the importance of the web page. Conventional search engines merely estimate the importance of a particular matching web page based upon the content of the page and the hypertext (or citation) structure of the surrounding web. The conventional search engines do not take into consideration the frequency of visits to the web page in estimating the importance of the web page. Furthermore, when propagating scores along the hypertext structure of the web, the score of a page is typically divided equally amongst the destination pages, rather than taking into consideration the relative popularity of the outgoing links from the page.

Therefore, there is a need for a method and system for monitoring and analyzing the actual popularity of pages on a network, for example, web pages. There is also a need for monitoring and analyzing the popularity of links between pages in a hyperlink network. There is also a need for a method and system for using the page popularity and/or link popularity in ranking the documents searched by a search engine.

SUMMARY OF THE INVENTION

The present invention provides a method and system for monitoring the popularity of web pages and using such popularity information to rank the web pages retrieved in response to a search, and also a method and system for monitoring the popularity of hypertext links in the WWW and using such link popularity information when propagating page scores along the hyperlinks to better rank the web pages retrieved in response to a search. The popularity of a web page is substantially proportionate to the actual number of visits to that web page. Web pages that are actually visited, as opposed to simply linked to or cited by other web pages, are considered to be more popular than pages that are visited less often. An Internet search engine uses the popularity of a web page, along with other criteria such as the content of the web page or its associated hyperlink structure, to determine the score of the page, i.e., the order in which the matching results are presented to the user.

In one embodiment of the present invention, the popularity of the web pages is determined by monitoring devices deployed in strategic locations on the Internet. The monitoring devices monitor packets traversing the Internet and detect TCP (Transmission Control Protocol) sessions that include accesses to web pages. The monitoring devices extract information such as the requested URI (Uniform Resource Identifier) or URL, the client IP address, a server IP address and a server host name, and a referrer URI, if any, from the packets in the TCP session. The extracted information is forwarded to a processing module that keeps track of popularity counts corresponding to each URL or URI, i.e., the actual number of visits to a particular URL or URI based upon the extracted information. The popularity count information is used by an Internet search engine to rank the web pages retrieved in response to a keyword search at least in part based upon the popularity count.

In another embodiment of the present invention, the popularity of links between web pages in a hypertext link structure is determined by monitoring TCP packets traversing the links between pages. Information such as the requested URI (Uniform Resource Identifier) or URL, the client IP address, a server IP address and a server host name, and a referrer URI, if any, from the packets in the TCP packets. The link popularity is determined based upon the extracted information, such as the referrer URI and the requested URI. A PageRank style algorithm that analyzes the hyperlink structure across web pages may be augmented to use the link popularity when propagating scores across hyperlinks. For instance, the score of a first web page may be propagated to a plurality of second web pages to which the first web page is linked substantially in proportion to the relative popularity of the links from the first web page to each of the second web pages.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
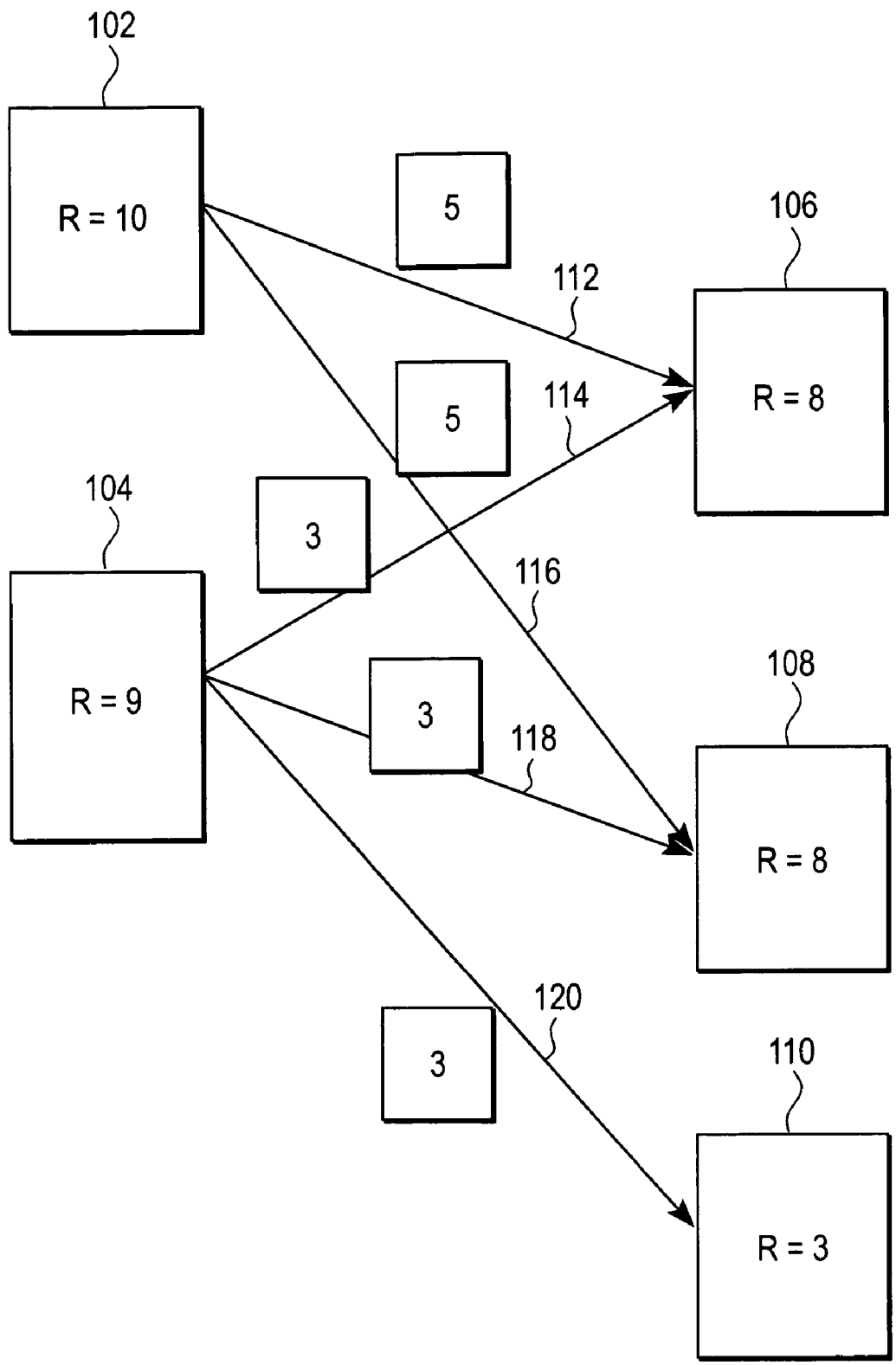
FIG. 1 is a diagram illustrating the concept of using the hypertext link structure of the World Wide Web (WWW) to refine the score of a web page on the WWW.

The embodiments of the present invention will be described below with reference to the accompanying drawings. Where possible, like reference numerals are used for like elements in the accompanying drawings.

Figure 2:
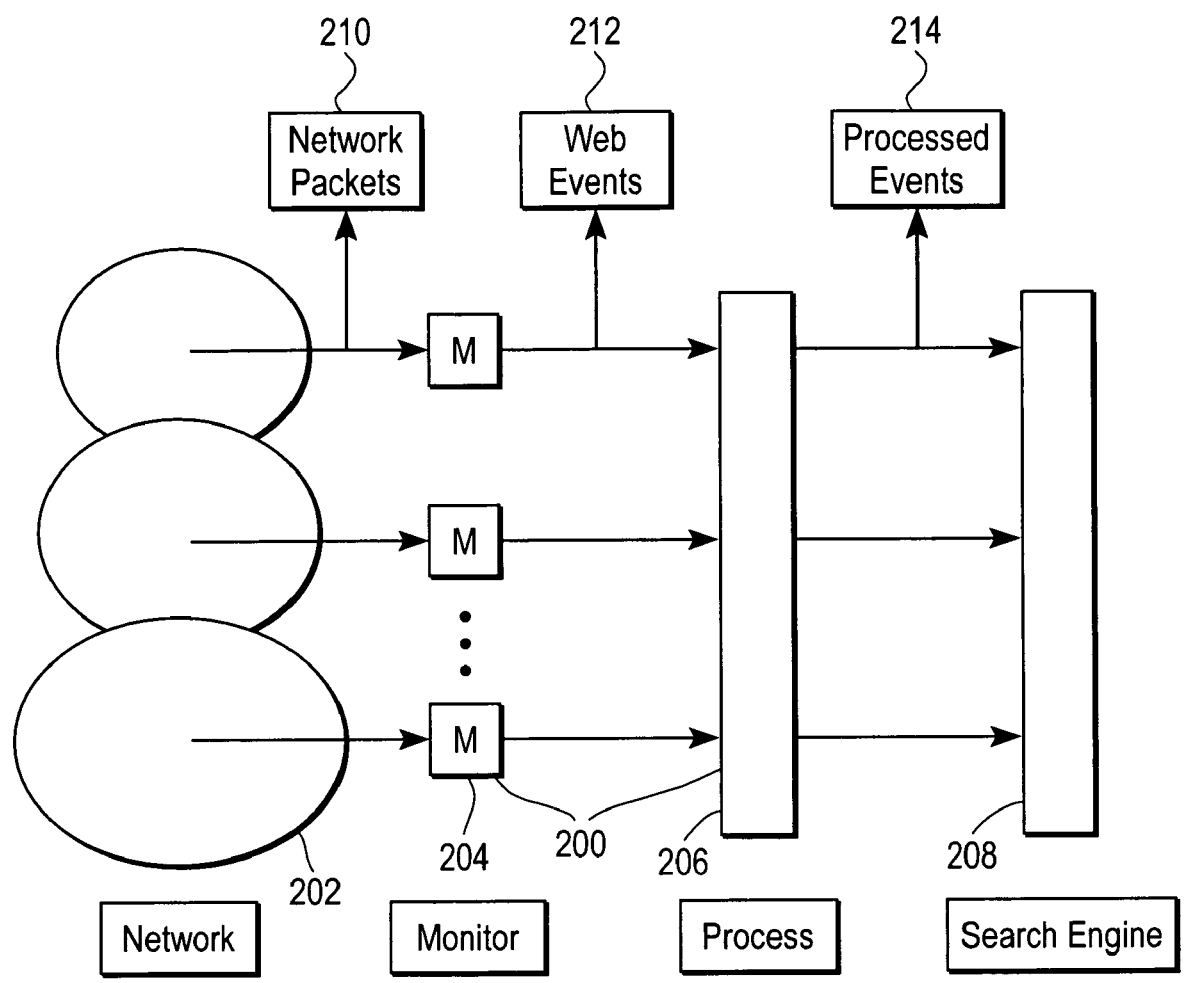
FIG. 2 is a diagram illustrating the architecture of the system for monitoring the popularity of web pages, according to one embodiment of the present invention.

FIG. 2 is a diagram illustrating the architecture of the system 200 for monitoring the actual popularity of web pages, according to one embodiment of the present invention. The system 200 includes a plurality of monitoring devices 204 and a processing module 206. Although FIG. 2 shows one processing module 206, there could be a plurality of processing modules 206 depending upon the physical deployment of the monitoring devices 204. The monitoring devices 204 are physically embedded in strategic locations within a data communication network 202, such as the Internet. The monitoring devices 204 are transparent and impartial monitoring devices that monitor the data traffic in the network 202 and examine data packets that traverse the network 202. The monitoring devices extract certain information about the data packets, and perform initial filtering of the information, and generate web events describing each individual web activity.

These web events are sent to the processing module 206 that performs additional filtering of the extracted information, recognizes and discards attempts to manipulate the actual popularity data, and discards duplicate events, etc. The processing module 206 generates the popularity data that represent the page popularity (the number of visits to nodes (URLs)) and link popularity (the number of traversal of edges (hyperlinks between URLs) of the hyperlink structure). The page popularity and link popularity data are forwarded to a search engine 208 for use in ranking search results.

Figure 3:
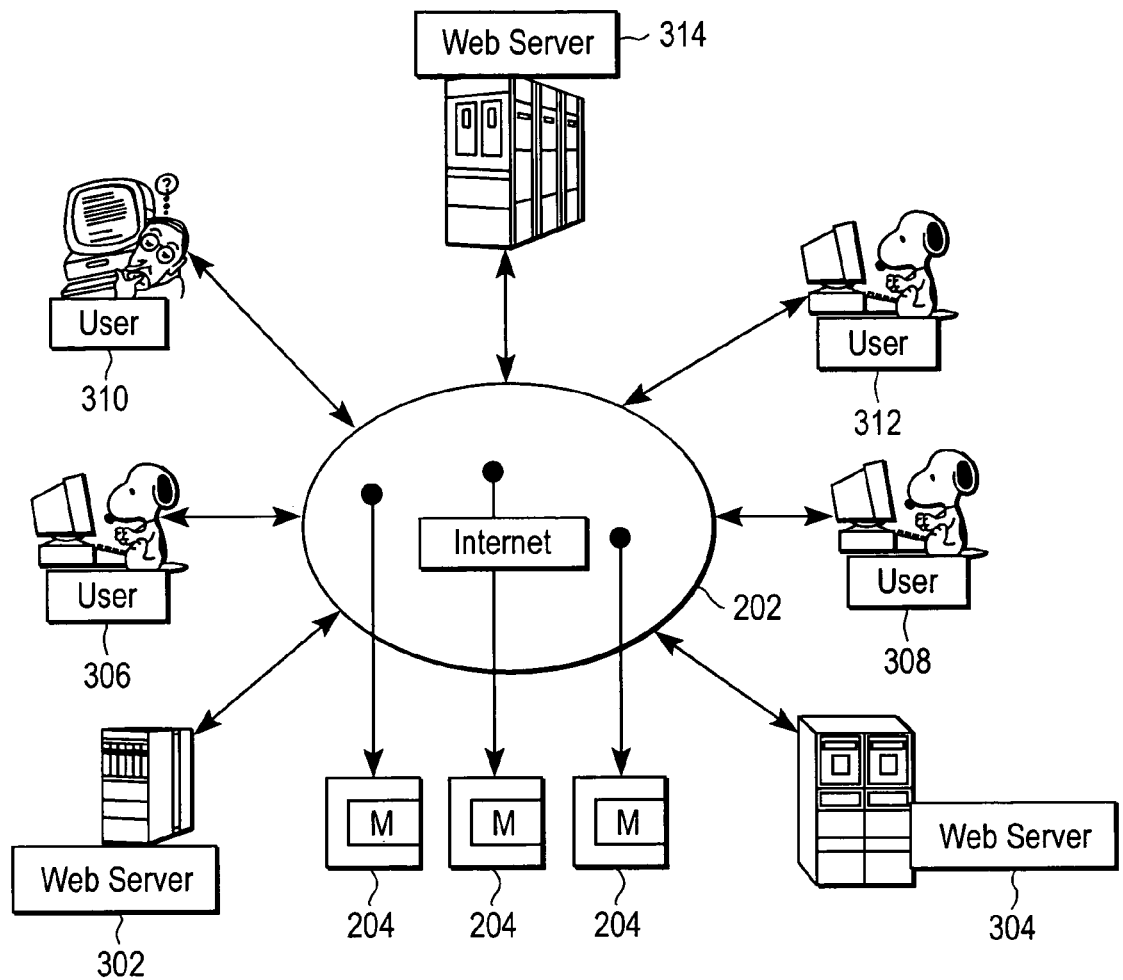
FIG. 3 is a diagram illustrating the deployment of monitoring devices for monitoring Internet data traffic, according to one embodiment of the present invention.

FIG. 3 is a diagram illustrating the deployment of monitoring devices 202 for monitoring Internet data traffic, according to one embodiment of the present invention. The Internet 202 connects a number of devices, such as client devices 306, 308, 310, 312 and web servers 302, 304, 314 through a data communication network 202 such as the Internet. Monitoring devices 204 are installed at selected points within the network 202. These monitoring devices 204 extract information from data packets traveling the network 202 to determine the popularity of both web pages and web links.

The monitoring devices 204 are passive, non-intrusive devices that have visibility into packets traversing the portion of the network being monitored at the location at which the monitoring devices 204 are deployed. The monitoring devices 204 are invisible on the network in the sense that their existence (or lack thereof) cannot be detected by either a user or a server in a web session. The monitoring devices 204 may be, for example, a conventional packet monitoring ("sniffing") device, but with added functionalities for extracting and processing information relating to the popularity of web pages or URLs according to the present invention. Some conventional packet monitoring devices are purely software-based, while others run on dedicated network hardware. One example of a conventional packet monitoring device is one provided by Narus, Inc. of Mountain View, Calif., as described, for example, in U.S. patent application Ser. No. 09/397,491, entitled "Method and Apparatus for Providing Additional Information in Response to an Application Server Request" filed on Sep. 15, 1999 and assigned to the same assignee as the present application. In one embodiment, a packet monitoring device in accordance with the present invention provides advantages that include:

(i) It requires only a passive tap into network traffic, and does not sit in line with network activity. As a result it is completely non-intrusive to network activity, and it is invisible and undetectable to both the client and the server, and therefore unlikely to affect the behavior of either the client or the server.

(ii) It is based on TCP/IP standard protocols, and is therefore easily deployed in a heterogeneous environment.

(iii) It can process packets at extremely high speeds, and has the capacity to monitor high-speed backbone links, such as those running at Gigabit Ethernet or OC-48 (Optical Carrier Level at 2.488 Gbps) rates.

(iv) It has the ability to analyze packets within the context of the enclosing application level protocol. Thus, Narus' monitoring device is capable of performing session level analysis across packets within that session. It is therefore able to recognize and discard retransmitted requests, extract URLs that are split across multiple packets, and the like.

Figure 4:
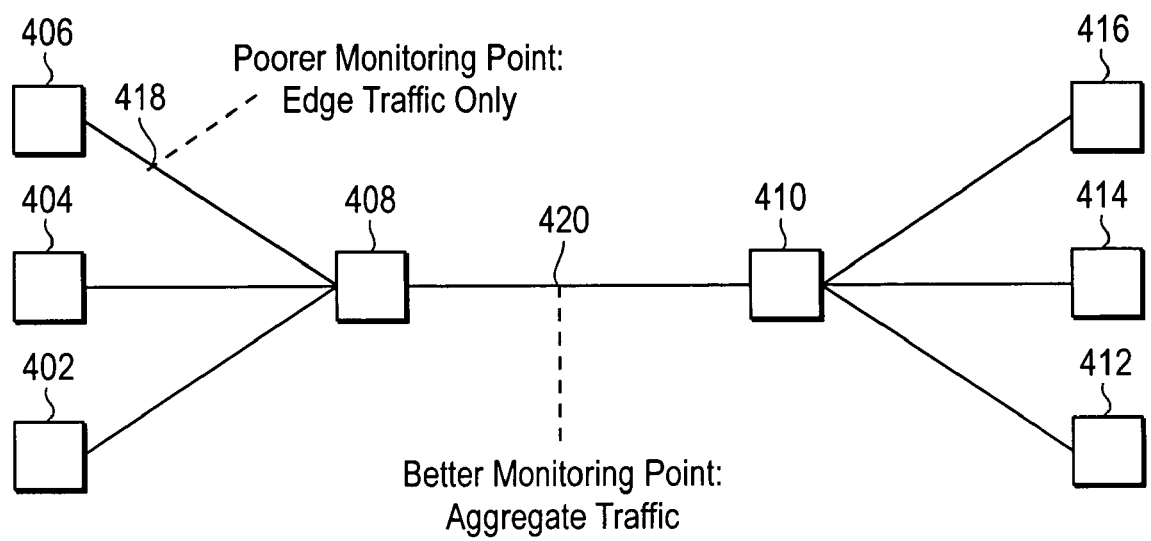
FIG. 4 is a diagram illustrating the locations for deployment of the monitoring devices for monitoring Internet data traffic, according to one embodiment of the present invention.

FIG. 4 is a diagram illustrating the locations for deployment of monitoring devices for monitoring Internet data traffic, according to one embodiment of the present invention. In order to extract information relating to the popularity of URLs from packets traversing the network 202, these monitoring devices 204 are deployed carefully within a network. Monitoring the entire network 202 is both impractical and unnecessary. It is adequate to monitor selected portions of the network 202 to obtain statistically representative popularity data. The monitoring devices 204 are deployed based upon network architecture to identify good monitoring network links.

Ideally, each monitoring point is a traversal point for complete bidirectional activity between a client device 306, 308, 310, 312 and a server 302, 304, 314. However, this is not a strict requirement, since the desired popularity information can also be extracted by examining only the requests from the client 306, 308, 310, 312 to the server 302, 304, 314 (i.e., unidirectional traffic) as well. In one embodiment of the present invention, the monitoring points are determined based upon the following criteria as set forth below:

First, network traffic aggregation points are desirable as the monitoring points since they enable a single monitoring device to examine a large portion of the traffic. A single point—a set of network links—is likely to contain a lot of rich web traffic, in contrast to monitoring access points at the edge of a network where lots of monitoring points will be needed to achieve visibility into a comparable amount of traffic. Thus, referring to FIG. 4, point 420 is a better monitoring point since it can monitor aggregate traffic between web servers or client devices 408 and 410, which would include traffic between the web servers or client devices 402, 404, 406 and web servers or client devices 412, 414, 416. In contrast, point 418 is a less desirable monitoring point, since it can monitor only the edge traffic between web server or client device 406 and web server or client device 408, and therefore results in many more monitoring devices.

Second, the monitoring points are chosen so that a sufficient amount of traffic is examined so as to be statistically significant.

Third, since a monitoring device 204 tracks visits to the pages on a web-server, the monitoring devices 204 are deployed close to the web-servers enables them to see most (if not all) of the traffic to the web-servers. As a result, fewer monitoring devices 204 may be needed, whereas far more monitoring devices 204 would be needed if they were instead placed next to a number of client devices.

Finally, the monitoring devices 204 are deployed at locations enabling tailoring the popularity data by the geographical location of the client devices. For instance, if the monitoring devices 204 are deployed only in networks based in the United States, then they may not have the capability to monitor access to European web servers from European clients or from any non-U.S. client device. As a result, it will not be possible for search engines to distinguish the popularity of that web site amongst U.S.-based clients versus, for example, European clients. Thus, in one embodiment of the present invention, the monitoring devices are deployed in the network 202 within each region that contains web servers meriting such distinctions in popularity by the geographical location of the client devices. Although the ideal extreme would be to deploy a monitor in front of each web server, that would be impractical and costly. Since a significant portion of even non-U.S. based web service traffic is routed over a U.S.-based network, monitoring devices deployed only in U.S.-based networks are still able to collect substantial, statistically significant popularity data.

In one embodiment, the locations are selected such that the various monitoring devices 204 (i) can see complete HTTP (Hypertext Transfer Protocol) activity of a session rather than subsets of the packets transmitted and (ii) would not have the same HTTP activity be examined by more than one monitoring device 204. This way, each monitoring device 204 is able to gather complete information without duplicate counting of access to URL.

In another embodiments most of the popularity information is gathered by analyzing only a part of the logical HTTP session. For instance, sometimes the monitoring device 204 sees packet traffic only in one direction. However, it is still possible to extract most of the desired information from just the HTTP Get and Request packets. It is also possible to recognize duplicate events based on, for example, session ID generation technology developed by Narus, Inc. of Mountain View, as described in, for example, U.S. patent application Ser. No. 09/693,805 entitled "Methods and Apparatus for Eliminating Duplicate Network Data Traffic Reports," filed on Oct. 19, 2000 and assigned to the same assignee as the present application or U.S. patent application Ser. No. 09/693,798 entitled "Method and Apparatus for Adding a Unique Signature to Network Data Traffic," filed on Oct. 19, 2000 and assigned to the same assignee as the present application, both of which are incorporated by reference herein in their entirety.

Figure 5:
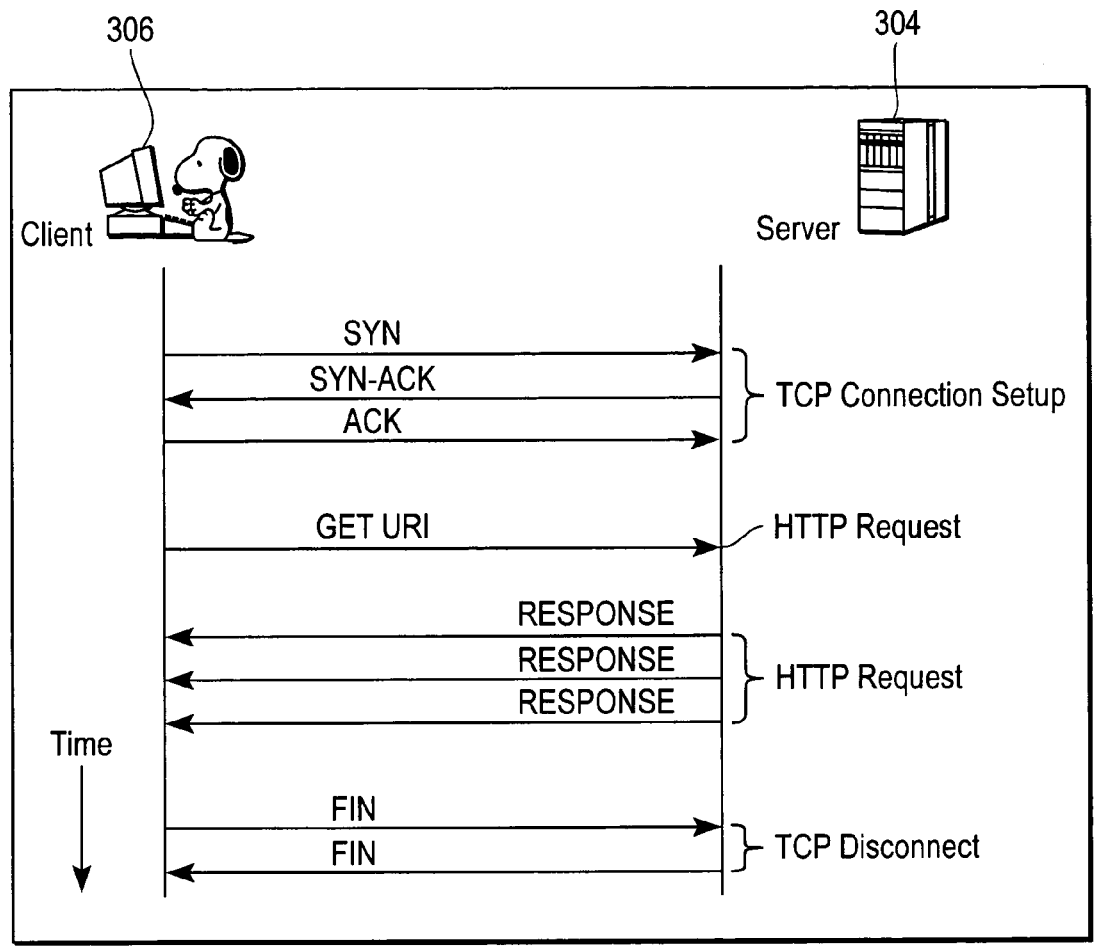
FIG. 5 is a diagram illustrating the sequence of network activity for a typical TCP session.

FIG. 5 is a diagram illustrating the sequence of network activity of a typical web session. When a user visits a web site, the client device 306 establishes a TCP connection with the server 304 (TCP Connection Setup). TCP connection setup involves the exchange of three network packets labeled SYN, SYN-ACK, and ACK.

Once the TCP connection has been established, a request packet (usually GET URI) containing the GET request along with the desired URI is sent from the client 306 to the server 304. This GET URI packet is a called an HTTP Request. The server 304 then responds with the requested web-page (HTTP Response). The HTTP Response may be delivered to the client 306 over a plurality of RESPONSE packets, if the contents of the web-page exceed the capacity of a single packet.

Then, the HTTP Request-HTTP Response sequence may repeat itself in certain HTTP versions (e.g., HTTP version 1.1). Finally the TCP session is terminated by the exchange of FIN packets (TCP Disconnect).

Figure 6:
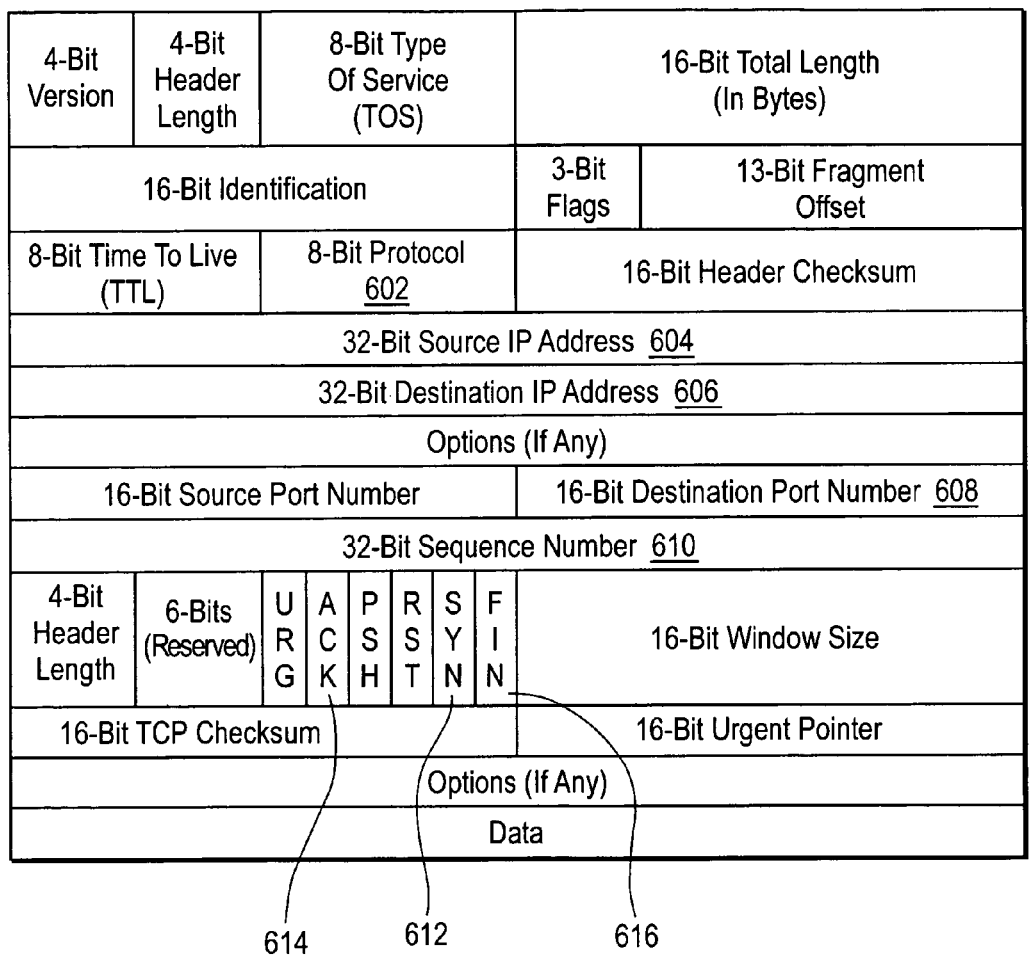
FIG. 6 is a diagram illustrating the structure of a typical TCP packet.

FIG. 6 is a diagram illustrating the structure of a typical TCP packet. The structure of a TCP packet is known in the art and thus will not be explained in detail herein. Examples of the fields of the TCP packet that may be particularly relevant to monitoring the popularity of web pages according to the present invention include:

(i) The 8-bit protocol field 602; a value of 6 indicates TCP, which is the underlying protocol for HTTP. All non-TCP packets are discarded by determining the 8-bit protocol field 602, since only TCP packets are relevant to the popularity of web pages.

(ii) The 32-bit source IP (Internet Protocol) address 604 and the 32-bit destination IP address 606, to identify the source and destination points of the packet.

(iii) The 16-bit destination port number 608; a value of 80 typically indicates HTTP. All non-HTTP packets can be discarded by examining the 16-bit destination port number 608.

(iv) The 32-bit sequence number 610, used to identify duplicate, missing, or out-of-order packets and to ensure that packets are processed in the correct order.

(v) The SYN 612, ACK 614, and FIN 616 flag bits, used to identify TCP session setup and teardown.

These fields of the TCP packets are monitored by the monitoring devices 204 and the processing module 206 to determine the popularity of the web pages.

Figure 7:
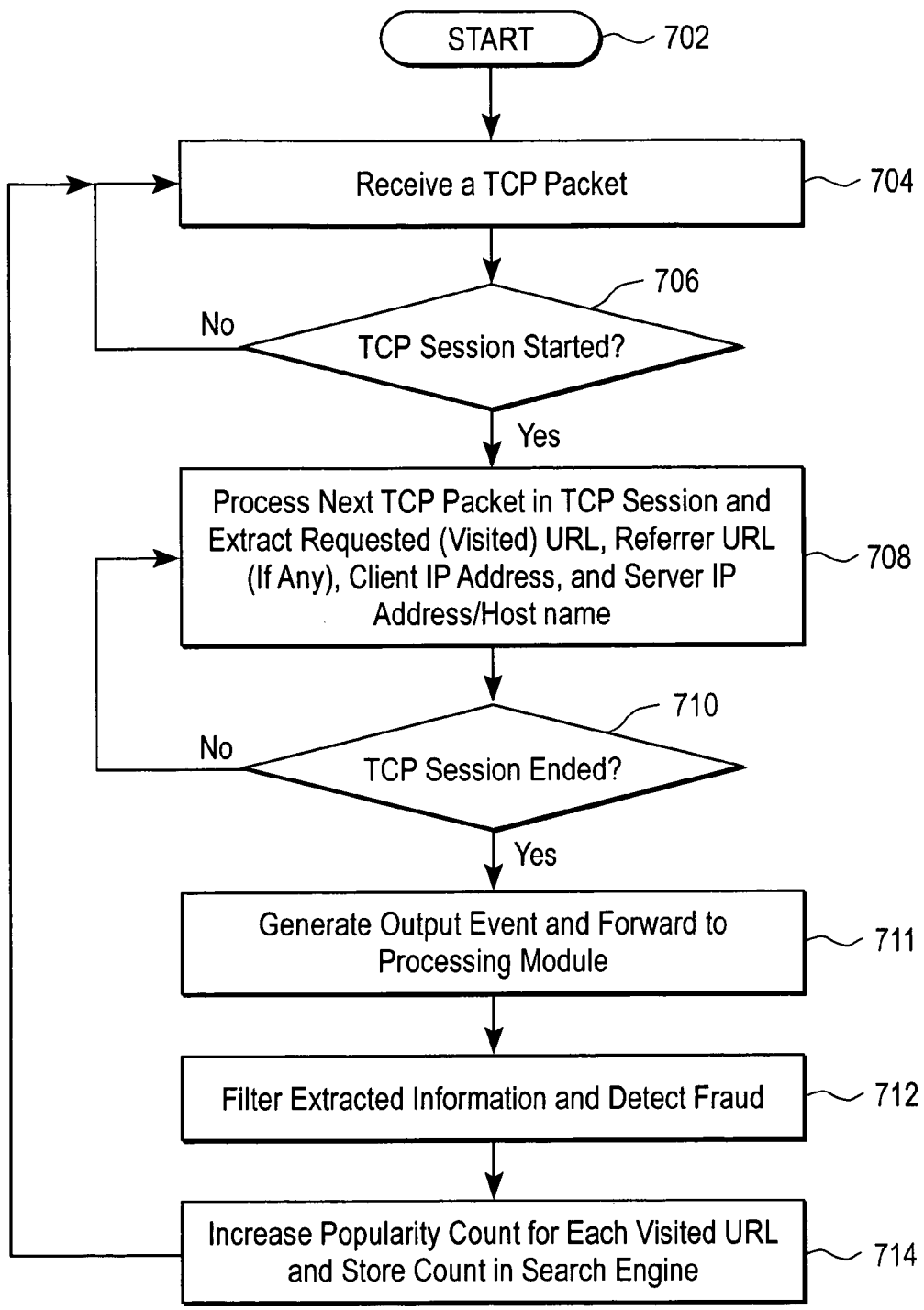
FIG. 7 is a flowchart illustrating a method for monitoring and analyzing TCP packets to determine the popularity of web pages, according to one embodiment of the present invention.

FIG. 7 is a flowchart illustrating a method for monitoring and analyzing TCP packets to determine the popularity of web pages, according to one embodiment of the present invention. As the process is started 702, the monitoring devices 204 receive 704 a TCP packet. The 8-bit protocol field 602 of data packets is used to select only TCP packets. Next, the monitoring devices 204 determine 706 whether a TCP session has started by determining whether the packet is a SYN packet for starting a TCP session. If the destination port of the SYN packet is 80 (i.e., it is an HTTP session), then the next TCP packets are tracked and processed 708 (i.e., a session structure is created to track this TCP session).

To this end, the monitoring devices 206 processes 708 the subsequent TCP packets in sequence based upon their sequence numbers, and extracts 708 information used for determining the popularity of web pages from the TCP packets 708 until the end 710 of the TCP session. The processed subsequent packets in an HTTP session are either GET Requests from the client device 306 to the server 304, or a Response in the opposite direction. This is determined by examining the data portion of the packet. HTTP supports multiple kinds of request methods, of which the most common is the GET method. HTTP is a text-based protocol, so a GET Request is easily identified since it begins with the keyword GET, followed by the requested URI and the HTTP version supported by the client. Note that long URIs may be split across multiple packets, in which case the session structure accumulates packets until the entire URI can be completely reconstructed by processing 708 the accumulated packets.

An additional parameter of interest that may be found in the Request packet is the "Referrer" attribute that is optionally passed by the client device 306. The "Referrer" attribute specifies the address (URI) of the resource from which the Requested URI was obtained. The Referrer attribute is not sent if the Request-URI was obtained from a source without its own URI, for example, directly input by a user. The Referrer URI is extracted from the GET packets along with the requested URI. The Referrer URI along with the requested URI may be used to determine that the link between the referrer URI and the requested URI is traversed to obtain the link popularity of the links in hypertext link structures, as will be explained with reference to FIGS. 9 and 10.

The response to the GET Requests is the sequence of packets sent from the server 304 to the client device 306. Invalid requests can be identified by monitoring the error codes, since the server 304 returns a document marked with an error code, in response to invalid requests, such as: HTTP/1.1 404 Not Found. These invalid GET requests are discarded from consideration in the popularity analysis by the monitoring devices 204. However, information about invalid requests may be useful to a search engine to identify stale web pages that have disappeared since the last time the page was crawled, so that those pages are no longer returned as a result of a web search. The monitoring devices 204 may separately deliver such stale web page information to the search engine 208 via the processing module 206. Similarly, the monitoring devices 204 may also detect pages/URLs that were not located by a web crawler, so that those pages can be crawled by a subsequent crawler and incorporated as part of a search. The monitoring devices 204 may also perform additional filtering of the extracted data, such as discarding packets relating to auto-refresh of the same web page, discarding invalid URLs, and discarding requests generated by web crawlers. For all remaining GET requests with a valid response, the monitoring devices 204 generates 711 an output event containing the extracted information, including the requested URI or URL, the referrer URI or URL (if any), the client IP address, and the server IP address and the host name, and the like. The output event information is forward to the processing module 206 for further processing.

The processing module 206 filters 712 the information extracted by the monitoring devices 204 and detects fraudulent attempts to manipulate the actual popularity data. For instance, a computer program could be designed to artificially inflate the popularity of a particular web site through repeated requests to web pages on that web site with the requests being automatically generated, rather than explicitly requested by a user. The processing module 206 may implement a variety of heuristics to detect and discard such spurious accesses that attempt to manipulate the popularity score of a web page. For example, along with the requested URL, the processing module 206 can also track the IP address of the client device 306 and assign a popularity point (count) for requests from distinct IP addresses only. An exception could be made for IP addresses that are well-known corporate firewalls (such as requests coming from within an enterprise), since they may appear as coming from a single client IP address. The processing module 206 may also track traffic patterns from client IP addresses, and use heuristics to detect attempts for manipulation such as accesses only to a single web location, repeated accesses with some predictable interval, extremely fast accesses to a location that are likely to be computer-generated rather than human-generated, etc.

As a result of the additional filtering of the fraudulent data, the processing modules 204 may obtain data including the visited URL, the referrer tag (if any), the client IP address, and the server IP address and host name, corresponding to valid accesses to web pages. The processing module 206 maintains at least one counter for each URL. The processing module 206 may also maintain a plurality of counters for each URL, one for each geographical region in which the client device 306 is located. For each visit to a particular web page, the processing module 206 increments 714 the counter corresponding to the particular web page and the geographical location. The counters corresponding to the particular web page are determined based upon the visited URL information. The particular counter corresponding to the geographical location of the client device 306 among those counters is determined based upon the client IP address. There are several publicly available databases that return the region, city, country, latitude, and longitude of the geographical location for a given IP address.

Figure 8:
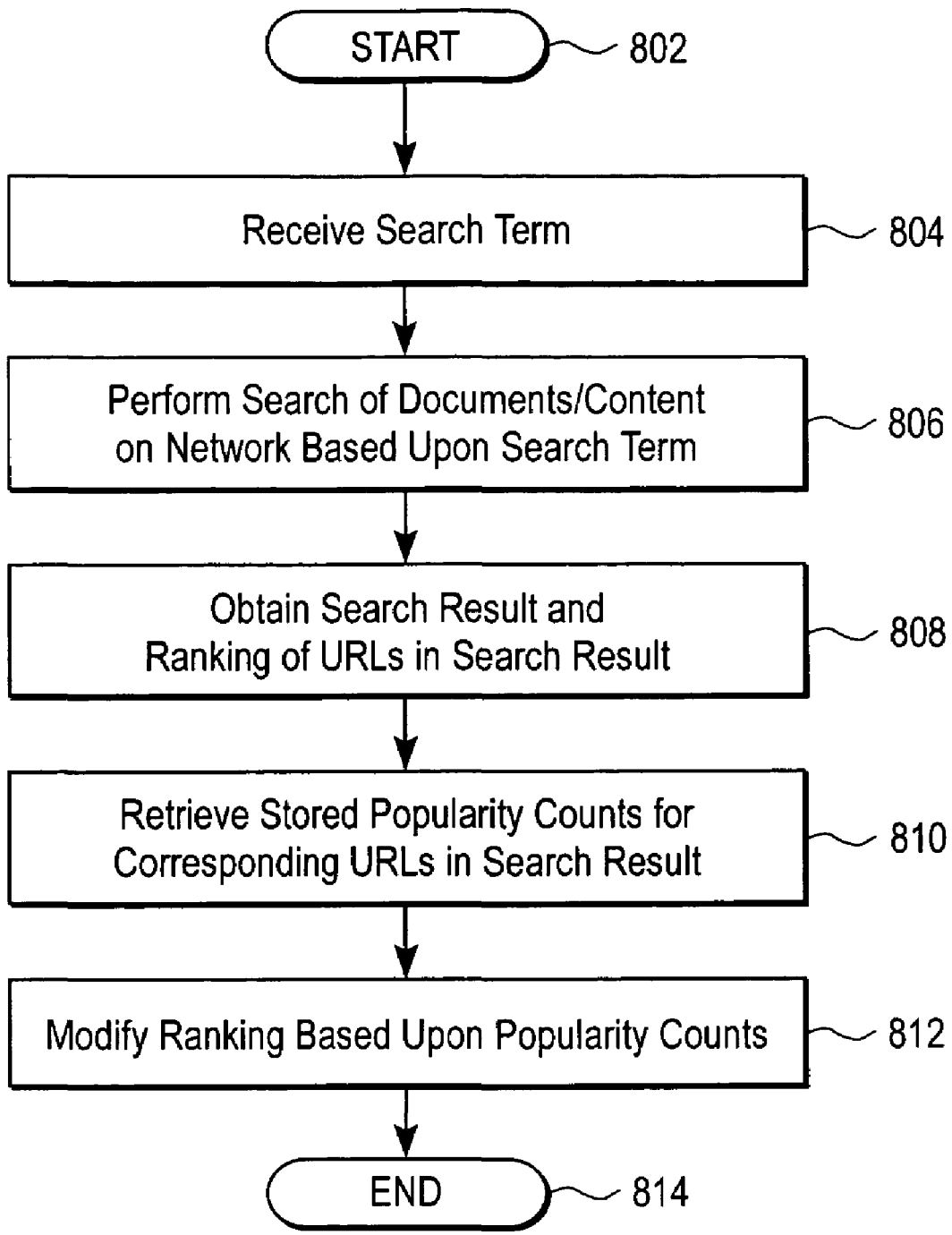
FIG. 8 is a flowchart illustrating a method for ranking web pages searched on the Internet based upon the popularity of the web pages.

FIG. 8 is a flowchart illustrating a method for ranking web pages searched on the Internet based upon the popularity of the web pages, according to one embodiment of the present invention. The process of FIG. 8 is carried out in a search engine 208 according to one embodiment of the present invention.

As the process is started 802, the search engine 208 receives 804 a search term from a user and performs 806 a keyword search of documents and content on the network 202 based upon the search term. The search engine 208 obtains 808 the search result, and computes the scores of the URLs in the search result based upon a conventional page rank algorithm. The conventional page rank algorithms are well known to one skilled in the art and thus will not be discussed herein in detail. The search engine 802 retrieves 810 the popularity counts for the corresponding URLs in the search result, and modifies 812 the page ranks (scores) of the URLs based upon the popularity counts. In one embodiment, the modified page rank is calculated as follows:

New Score=(0.7)×(Old Score)+(0.3)×(Popularity Count), after normalizing the old score and the popularity count.

Figure 9:
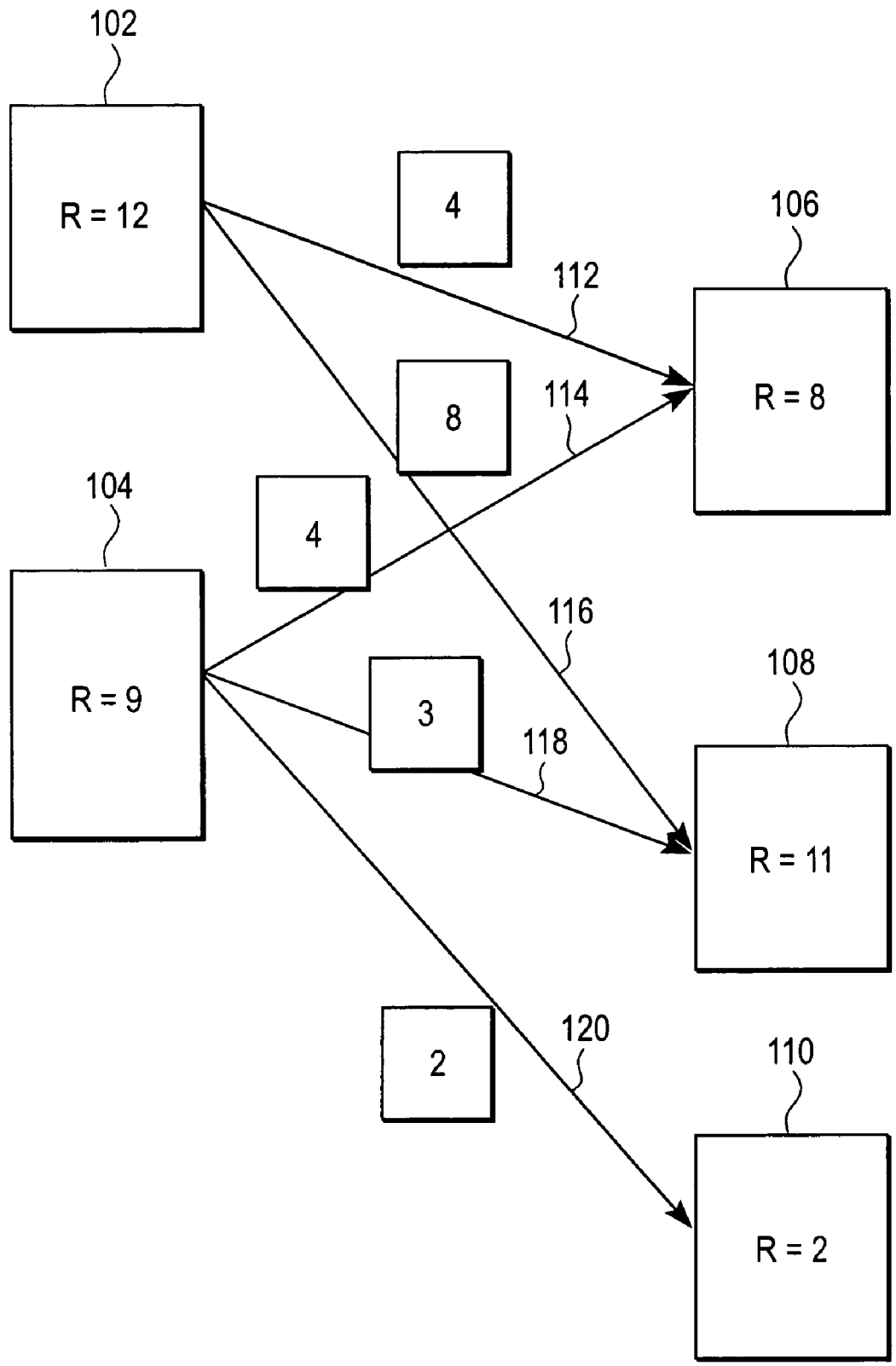
FIG. 9 is a diagram illustrating a method of dividing page rank among URLs hyperlinked on the World Wide Web, according to one embodiment of the present invention.

FIG. 9 is a diagram illustrating a method of dividing a page rank among URLs hyperlinked on the World Wide Web, according to one embodiment of the present invention. According to the present invention, the more popular edges are assigned a higher proportion of the rank of the source node as described in FIG. 9, in contrast to propagating page ranks equally along the outbound edges as described in FIG. 1. Thus, referring to FIG. 9, if node 102 with rank 12 has two outgoing edges, with one edge 112 accessed 10 times and another edge 116 accessed 20 times, then rather than dividing the rank as 6 and 6 along the edges 112, 116, the page rank of 12 is divided as 4 and 8 to nodes 106 and 108, respectively, along edges 112, 116, respectively. Likewise, if node 104 has a page rank of 9 with the edges 114, 118, 120 accessed 8 times, 6 times, and 4 times, respectively, the page rank of 9 is divided as 4, 3, and 2 to nodes 106, 108, 110, respectively, along the edges 114, 118, 120, respectively. As a result, the nodes 106, 108, 11 receive propagated page ranks of 8, 11, and 2, respectively, from the upper nodes 102, 104.

Figure 10:
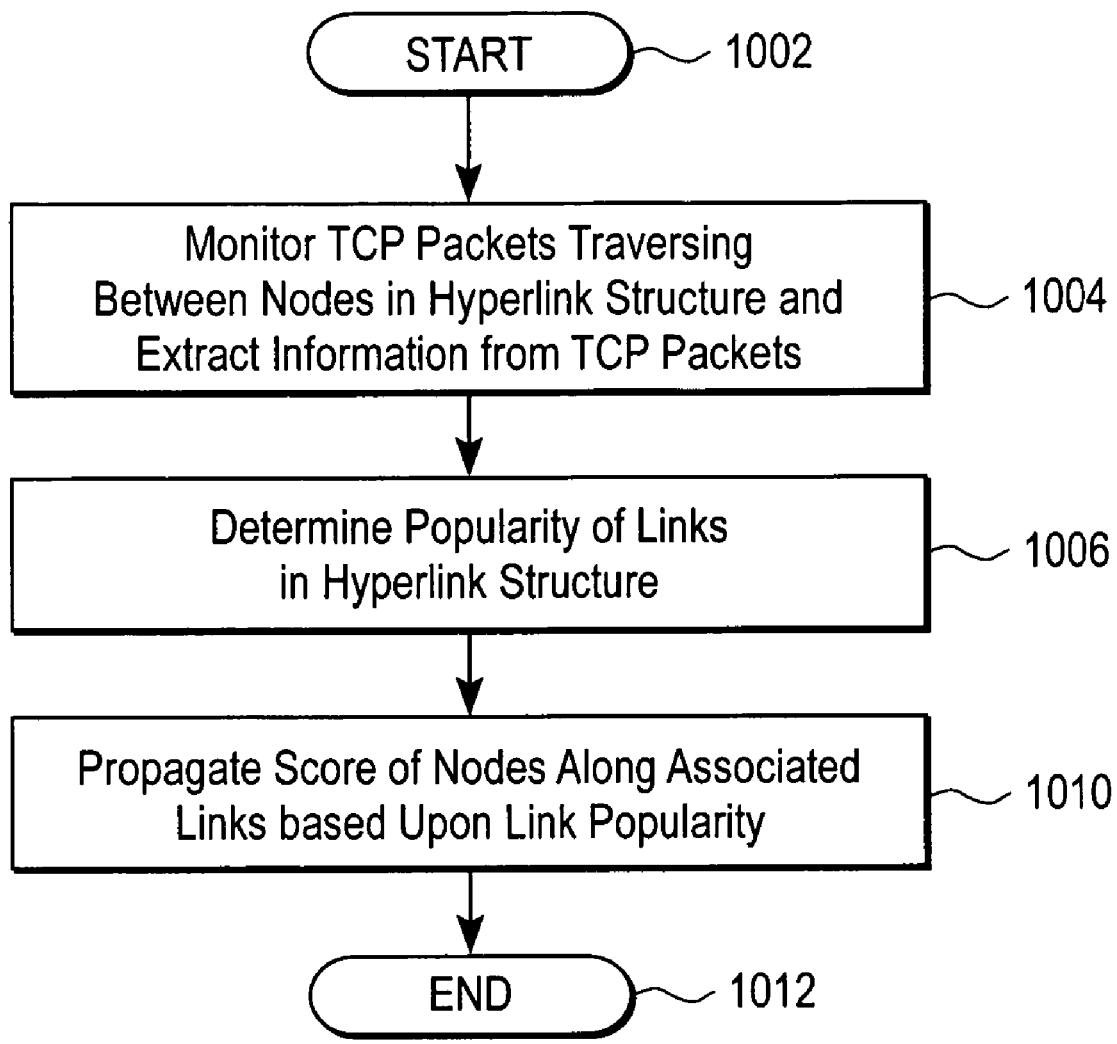
FIG. 10 is a flowchart illustrating a method for determining the link popularity between pages on a hypertext network.

FIG. 10 is a flowchart illustrating a method for determining the link popularity between pages on a hypertext network. As the process is started 1002, the monitoring devices 204 monitor 1004 TCP packets traversing between nodes in a hyperlink structure and extract 1004 information from TCP packets, similarly to steps 704, 706, 708, 710, and 711 of FIG. 7. The extracted information includes at least the requested URI or URL, the client IP address, a server IP address and a server host name, and a referrer URI, if any.

The processing module 206 determines 1006 the popularity of the links (link popularity) between the nodes, by examining the referrer URI and the requested URI or URL. The search engine 208 may propagate the score (page rank) of a first web page to a plurality of second web pages to which the first web page is linked in proportion to the relative popularity of the links from the first web page to the second web pages.

The present invention has the advantage that the popularity of the web pages can be used to refine and improve the page score of documents returned in response to an Internet keyword search. Furthermore, a PageRank style algorithm to propagate scores of a page within the hyperlink structure can be augmented with popularity information about each link. Popularity of the web pages is an impartial measure that is less susceptible to manipulation, compared to either content or hyperlinks. The popularity data is obtained without any affiliation with the Internet search itself. The popularity data in different geographical regions may also be collected, so that the page rank can be further refined to reflect the popularity in certain geographical regions. For instance, for a given search, the search results can be tailored based on the location of the client device, by returning results that are more popular in that geography and therefore likely more relevant, with a higher page rank.

Popularity automatically factors in the temporal nature of content, whereas both page ranks determined by content analysis and hyperlink analysis are largely static in nature. According to the present invention, web pages that are time-sensitive in content (such as news) will naturally be less visited over time, and therefore, less likely to be returned with a high priority as a result of a search. Since time-sensitive content is less relevant over time, naturally ranking time-sensitive content lower over time reflects the changing popularity of the time-sensitive content over time.

Although the present invention has been described above with respect to several embodiments, various modifications can be made within the scope of the present invention. For example, the intelligence and functionalities of the monitoring devices 202 and the processing module 204 of the present invention may be divided in any manner, and thus is not limited to what is described herein. The filtering of the extracted data and the fraud detection can be performed by solely the processing module 204, for example. The processing module 204 may be implemented in the form of a general purpose computer running software incorporating the functionalities of the present invention, or by a stand-alone hardware device. The functionalities of the monitoring devices can be incorporated into the stand-alone hardware device. The popularity data can be collected for a limited period of time or in a limited geographical region, in order to accommodate certain search needs.

Although the present invention has been described in the context of using the popularity data of web pages for ranking Internet search results returning web pages, the present invention also covers obtaining popularity information of any type of pages or documents, such as documents or pages residing in a document database. In this regard, the popularity of the documents or pages can be monitored by monitoring the number of accesses to the documents in the database, and then the popularity data is used to rank the documents returned in response to a query to the database.

Accordingly, the disclosure of the present invention is intended to be illustrative, but not limiting, of the scope of the invention, which is set forth in the following claims.

What is claimed is:

1. A search system for ranking Internet search results based upon popularity of web pages on a network, the search system comprising:
   a plurality of monitoring devices placed in the network, the monitoring devices monitoring packets traversing the network and extracting information on the packets;
   a processing module coupled to the monitoring devices and receiving the extracted information from the monitoring devices, the processing module analyzing the extracted information and determining the popularity of the web pages based upon the extracted information, the popularity of the web pages being proportionate to actual number of visits to the web pages as indicated by the extracted information; and
   a search engine for receiving search terms and retrieving web pages containing the search terms, the search engine ranking the web pages at least in part based upon the popularity of the retrieved web pages.

2. The search system of claim 1, wherein the search engine ranks the retrieved web pages based upon the content of the web pages and the hyperlink structure linking the web pages as well as the popularity of the retrieved web pages.

3. The search system of claim 1, wherein the search engine propagates a score of a first web page to a plurality of second web pages to which the first web page is linked in proportion to the popularity of links from the first web page to each of the second web pages.

4. The search system of claim 1, wherein the search engine ranks a first retrieved web page in higher priority than a second retrieved web page if the popularity of the first web page is greater than the popularity of the second web page.

5. The search system of claim 1, wherein the monitoring devices are placed in locations where aggregate packet traffic may be monitored.

6. The search system of claim 1, wherein the monitoring devices are placed at a traversal point for complete bi-directional activity between a client device and a server on the network.

7. The search system of claim 1, wherein the monitoring devices extract the information from packets in a TCP session, and the extracted information includes:
   a requested URI or URL;
   a client IP address; and
   a server IP address and a server host name.

8. The search system of claim 7, wherein the extracted information further includes a referrer URL.

9. The search system of claim 7, wherein the monitoring devices analyzes the packets relating to GET Requests in the TCP session to extract the information.

10. The search system of claim 1, wherein the monitoring devices discard packets relating to invalid URLs, invalid GET Requests, requests from a web crawler, or auto-refreshment of previous TCP sessions in extracting the information.

11. The search system of claim 1, wherein the processing module maintains a counter corresponding to a URL and increments a count of the counter if the extracted information indicates that the web page corresponding to the URL was visited, the count indicating the number of visits to the web page.

12. The search system of claim 1, wherein the processing module maintains a plurality of counters corresponding to a URL and increments a count of one of the counters if the extracted information indicates that the web page corresponding to the URL was visited by a client device located in a geographical location corresponding to the counter of which the count was incremented, the count indicating the number of visits to the web page from client devices in the corresponding geographical location.

13. The search system of claim 12, wherein the processing module increments the count only if the extracted information indicates that the web page was visited by the client device having a distinct IP address.

14. The search system of claim 12, wherein the processing module does not increment the count if the extracted information indicates that the packets were automatically and repeatedly generated by a computer.

15. The search system of claim 1, wherein the monitoring devices detect requests to stale web pages.

16. The search system of claim 1, wherein the monitoring devices detect pages unknown to the search engine.

17. A method for ranking Internet search results based upon popularity of web pages, the method comprising:
   receiving a search term;
   performing search of web pages on the Internet based upon the received search term;
   retrieving a plurality of web pages containing the search term; and
   ranking the web pages at least in part based upon the popularity of the retrieved web pages, the popularity of the retrieved web pages being determined based upon information extracted from packets traversing the Internet and being proportionate to actual number of visits to the web pages as indicated by the extracted information.

18. The method of claim 17, wherein ranking the web pages comprises ranking the web pages based upon the content of the web pages and the hyperlink structure linking the web pages as well as the popularity of the retrieved web pages.

19. The method of claim 17, further comprising propagating a score of a first web page to a plurality of second web pages to which the first web page is linked in proportion to the popularity of links from the first web page to each of the second web pages.

20. The method of claim 17, wherein ranking the web pages comprises ranking a first retrieved web page in higher priority than a second retrieved web page if the popularity of the first retrieved web page is greater than the popularity of the second retrieved web page.

21. A search system for ranking Internet search results based upon popularity of web pages, the search system comprising:
   a plurality of monitoring means placed in a network for monitoring packets traversing the network and extracting information on the packets;
   processing means coupled to the monitoring means for receiving the extracted information from the monitoring devices, analyzing the extracted information, and determining the popularity of the web pages based upon the extracted information, the popularity of the web pages being proportionate to actual number of visits to the web pages; and
   search engine means for receiving search terms and retrieving web pages containing the search terms, the search engine means ranking the web pages at least in part based upon the popularity of the retrieved web pages.

22. A search system comprising:
a plurality of monitoring devices placed in the network, the monitoring devices monitoring packets traversing the network and extracting information on the packets;
a processing module coupled to the monitoring devices and receiving the extracted information from the monitoring devices, the processing module analyzing the extracted information and determining the popularity of the links from a first web page to a plurality of second web pages based upon the extracted information, the popularity of each of the links being proportionate to number of times each of the links is actually traversed as indicated by the extracted information; and
a search engine for receiving search terms and retrieving web pages containing the search terms, the search engine propagating a score of the first web page to the second web pages to which the first web page is linked in proportion to the popularity of links from the first web page to each of the second web pages.

* * * * *